United States Patent
Ganapathy et al.

(10) Patent No.: US 6,731,406 B1
(45) Date of Patent: May 4, 2004

(54) SEGMENTED MULTILEVEL SCREENING FOR PRINTING FILES IN A PAGE DESCRIPTION LANGUAGE

(75) Inventors: Praveen K. Ganapathy, Bangalore (IN); Subramanian Ravi, Bangalore (IN); Vivek Kumar Thakur, Plano, TX (US); Ramachandran Srinivasan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/397,213

(22) Filed: Sep. 16, 1999

Related U.S. Application Data

(60) Provisional application No. 60/100,603, filed on Sep. 16, 1998.

(51) Int. Cl.$^7$ ................................................. H04N 1/40
(52) U.S. Cl. ...................................... 358/3.1; 358/3.16
(58) Field of Search ................. 358/3.1, 1.9, 3.11–3.12, 358/3.16–3.19, 3.21, 3.22, 3.13–3.14; 382/237

(56) References Cited

U.S. PATENT DOCUMENTS 4,903,123 A * 2/1990 Kawamura et al. ......... 358/533
6,538,771 B1 * 3/2003 Sakatani et al. ............. 358/2.1

FOREIGN PATENT DOCUMENTS

WO    WO 9639772 A1 * 12/1996    ............ H04N/1/40

\* cited by examiner

Primary Examiner—Thomas D. Lee
Assistant Examiner—Stephen Brinich
(74) Attorney, Agent, or Firm—Robert D. Marshall, Jr.; W. James Brady, III; Frederick J. Telecky, Jr.

(57) ABSTRACT

This invention involves approximating a gray scale tone with a more limited range image producer, a process known as screening. This invention reduces the time needed for such screening by discriminating when screening is not needed. In a first embodiment, the rendering process produces a minimally enclosing bounding box surrounding all rendered objects. In an alternative embodiment, scan lines including any part of a rendered object are noted. The screening makes better use of memory by dividing each row of a preference matrix into segments. The lookup tables associated with these segments are sequentially loaded into a memory cache. Input pixels mapping into the loaded segment lookup tables are screened. Then the lookup table associated with the next segment of the preference matrix are loaded into the memory cache and used to screen input pixels mapping into that segment. The method of packs two output pixels into a single data word while multi-level screening even when the preference matrix has an odd row length by alternating consideration of M−1 input pixels and M+1 input pixels, where M is the row length.

8 Claims, 8 Drawing Sheets

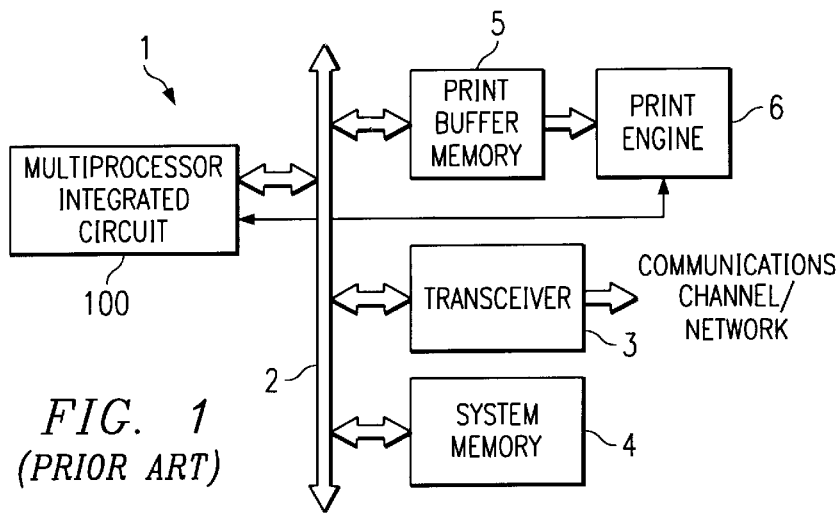
FIG. 1
(PRIOR ART)
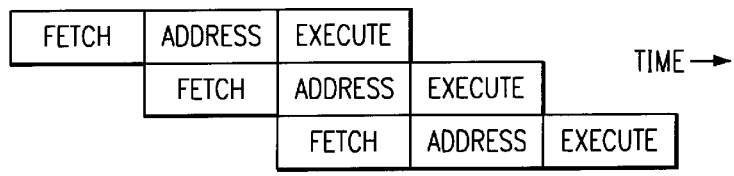
FIG. 4
(PRIOR ART)
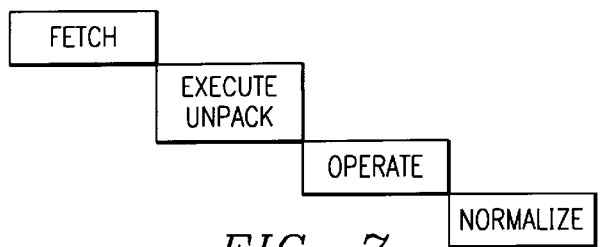
FIG. 6
(PRIOR ART)
FIG. 7
(PRIOR ART)

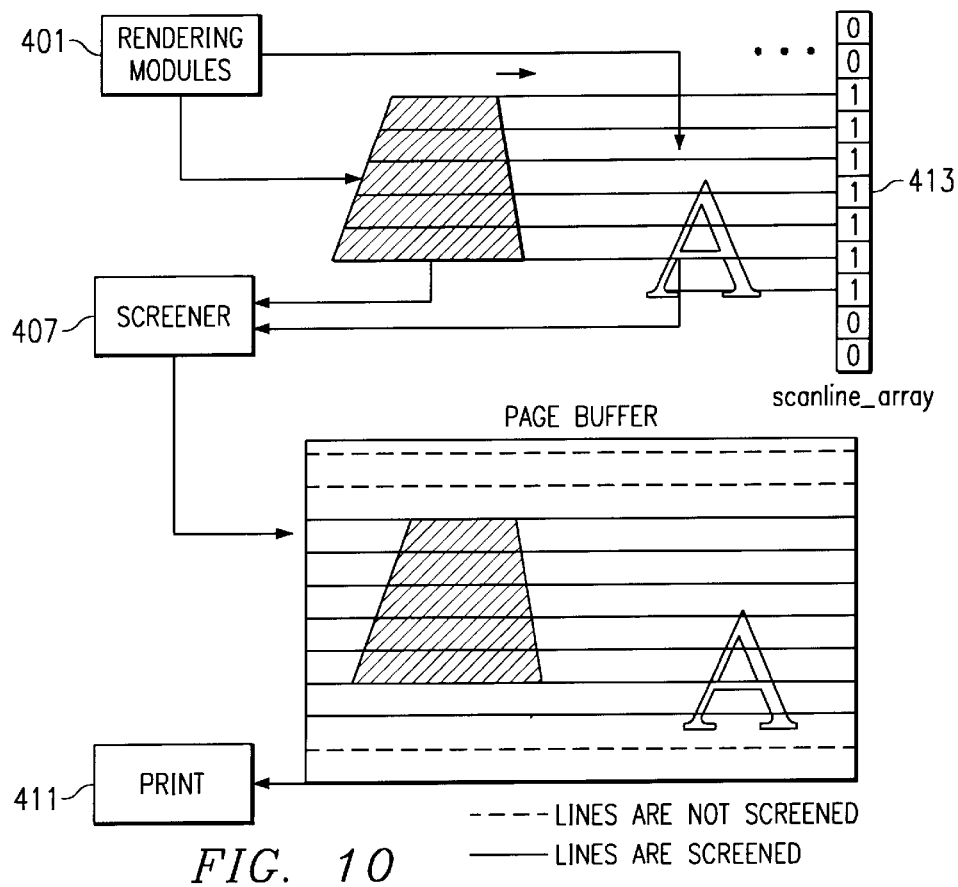
FIG. 10
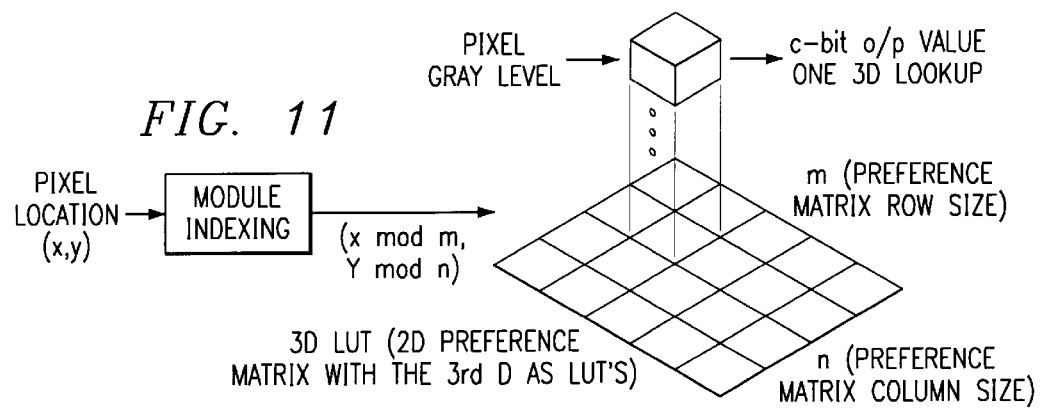
FIG. 11
FIG. 12

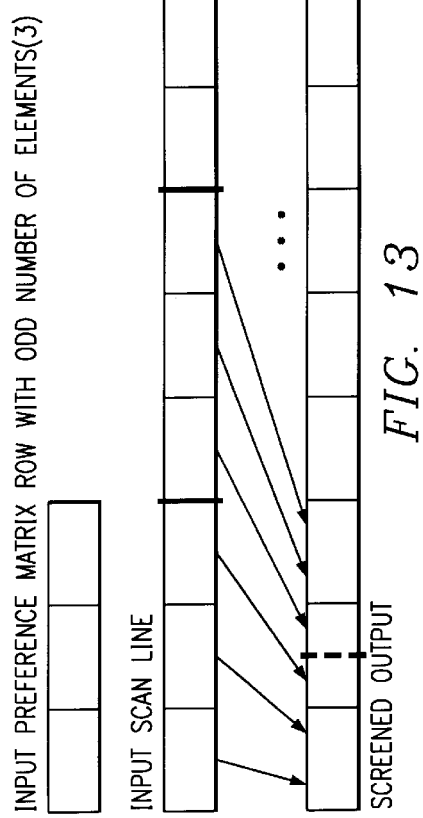
FIG. 13
FIG. 14
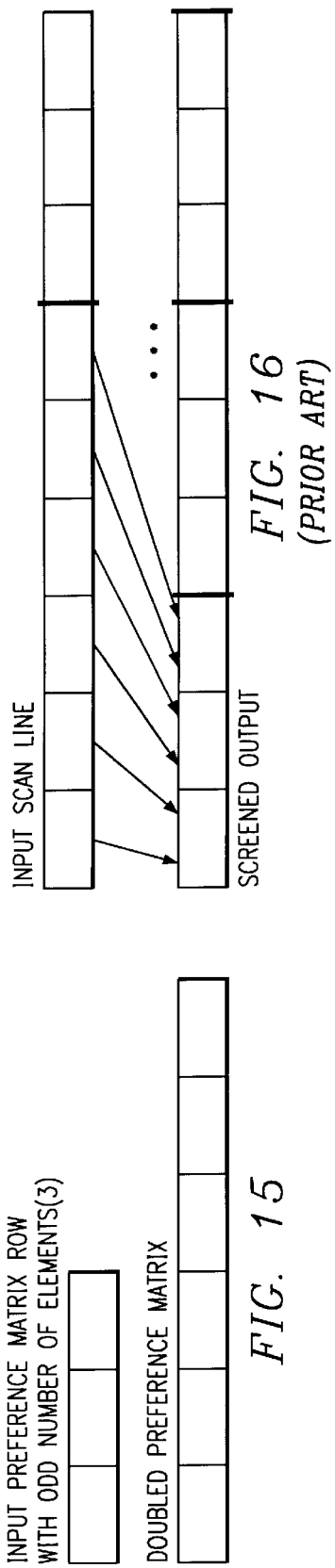
FIG. 16
(PRIOR ART)
FIG. 15

SEGMENTED MULTILEVEL SCREENING FOR PRINTING FILES IN A PAGE DESCRIPTION LANGUAGE

This application claims priority under 35 USC §119(e)(1) of Provisional Application No. 60/100,603, filed Sep. 16, 1998.

TECHNICAL FIELD OF THE INVENTION

The technical field of this invention is printers and more particularly the electronics of printers that converts input data in the form of a page description file into control signals for the print engine.

BACKGROUND OF THE INVENTION

Screening is the process of rendering the illusion of continuous-tone pictures on displays that are only capable of producing digital picture elements. In the process of printing images, large gray levels of the input picture have to be simulated by the printing device to reproduce a perfect duplicate of the original image. However, in the printed image the pixel resolution can be limited to that which is perceivable by the eye. Hence by grouping the adjacent pixels it is possible to simulate a continuous tone in the image.

Screening may take place by a threshold method in one of two categories: bi-level threshold screening; and multi-level threshold screening. In bi-level threshold screening the (x,y) coordinates of the input pixel are used to index into a two dimensional m by n matrix. The individual entries in the matrix are gray level thresholds which are compared against the input pixel gray level. A binary value (0 or 1) is output based on the results of the comparison. Multi-level screening indexes into a three dimensional lookup table. This three dimensional lookup table is organized as a two dimensional preference matrix of size M by N. The preference matrix is a repeatable spatial tile in the image space. Each entry of the preference matrix has a number of the tone curve which has to be used for the position of (x,y). The tone curve is the compensation transfer function of the input pixel gray value range to within range of the printing process. The tone-curve transfer function is quantized based on a set of thresholds and stored in the form of lookup tables. The lookup tables each contain $2^b$ entries for an unscreened input pixel of size b-bits. All the $2^b$ entries contain the corresponding screened output pixel of size c-bits. This process provides a manner of translating the large dynamic range of the input image into the smaller dynamic range of the printer by mixing colors within the printer dynamic range.

SUMMARY OF THE INVENTION

This invention involves approximating a gray scale tone with a more limited range image producer, a process known as screening. The screening makes better use of memory by dividing each row of a preference matrix into segments. The lookup tables associated with these segments are sequentially loaded into a memory cache. Input pixels mapping into the loaded segment lookup tables are screened. Then the lookup table associated with the next segment of the preference matrix are loaded into the memory cache and used to screen input pixels mapping into that segment. This process continues unit all pixels of a scan line have been screened.

BRIEF DESCRIPTION OF THE DRAWINGS

These and other aspects of this invention are illustrated in the drawings, in which:

FIG. 1 illustrates the system architecture of an image processing system such as would employ this invention;

FIG. 4 illustrates in schematic form the pipeline stages of operation of the digital image/graphics processor illustrated in FIG. 2;

FIG. 6 illustrates the integer pipeline operation of the master processor;

FIG. 7 illustrates the floating point pipeline operation of the master processor;

FIG. 10 illustrates an example of application of the scan line method;

FIG. 11 illustrates the structure of the three dimensional lookup table typically used in prior art screening;

FIG. 12 is an example of a 4 by 4 preference matrix;

FIG. 13 illustrates the problem of the prior art for the case of a preference matrix having a row dimension of an odd number of elements;

FIG. 14 illustrates schematically an aspect of the method of present invention;

FIG. 15 illustrates the inventive method of handling preference matrices having a row dimension of an odd number;

FIG. 16 illustrates schematically the prior method of indexing to the lookup table for screening with a preference matrix having an odd M;

DETAILED DESCRIPTION OF PREFERRED EMBODIMENTS

Figure 2:
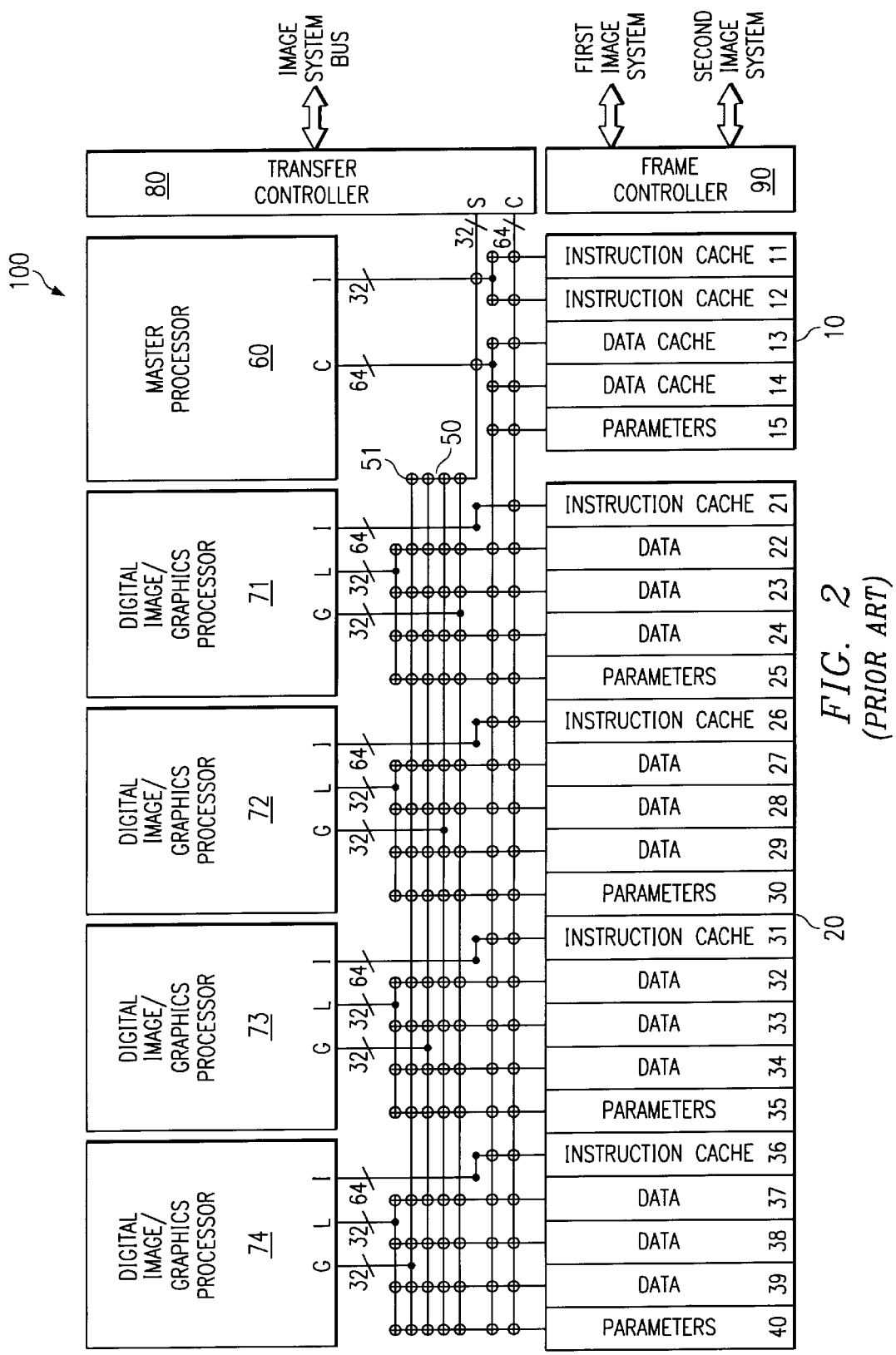
FIG. 2 illustrates the architecture of a single integrated circuit multiprocessor that forms the preferred embodiment of this invention.

FIG. 1 is a block diagram of a network printer system 1 including a multiprocessor integrated circuit 100 constructed for image and graphics processing according to this invention. Multiprocessor integrated circuit 100 provides the data processing including data manipulation and computation for image operations of the network printer system of FIG. 1. Multiprocessor integrated circuit 100 is bi-directionally coupled to a system bus 2.

FIG. 1 illustrates transceiver 3. Transceiver 3 provides translation and bidirectional communication between the network printer bus and a communications channel. One example of a system employing transceiver 3 is a local area network. The network printer system illustrated in FIG. 1 responds to print requests received via the communications channel of the local area network. Multiprocessor integrated circuit 100 provides translation of print jobs specified in a page description language, such as PostScript, into data and control signals for printing.

FIG. 1 illustrates a system memory 4 coupled to the network printer system bus. This memory may include video random access memory, dynamic random access memory, static random access memory, nonvolatile memory such as EPROM, FLASH or read only memory or a combination of these memory types. Multiprocessor integrated circuit 100 may be controlled either in wholly or partially by a program stored in the memory 4. This memory 4 may also store various types of graphic image data.

In the network printer system of FIG. 1 multiprocessor integrated circuit 100 communicates with print buffer memory 5 for specification of a printable image via a pixel map. Multiprocessor integrated circuit 100 controls the image data stored in print buffer memory 5 via the network printer system bus 2. Data corresponding to this image is recalled from print buffer memory 5 and supplied to print engine 6. Print engine 6 provides the mechanism that places color dots on the printed page. Print engine 6 is further responsive to control signals from multiprocessor integrated circuit 100 for paper and print head control. Multiprocessor integrated circuit 100 determines and controls where print information is stored in print buffer memory 5. Subsequently, during readout from print buffer memory 5, multiprocessor integrated circuit 100 determines the readout sequence from print buffer memory 5, the addresses to be accessed, and control information needed to produce the desired printed image by print engine 6.

According to the preferred embodiment, this invention employs multiprocessor integrated circuit 100. This preferred embodiment includes plural identical processors that embody this invention. Each of these processors will be called a digital image/graphics processor. This description is a matter of convenience only. The processor embodying this invention can be a processor separately fabricated on a single integrated circuit or a plurality of integrated circuits. If embodied on a single integrated circuit, this single integrated circuit may optionally also include read only memory and random access memory used by the digital image/graphics processor.

FIG. 2 illustrates the architecture of the multiprocessor integrated circuit 100 of the preferred embodiment of this invention. Multiprocessor integrated circuit 100 includes: two random access memories 10 and 20, each of which is divided into plural sections; crossbar 50; master processor 60; digital image/graphics processors 71, 72, 73 and 74; transfer controller 80, which mediates access to system memory; and frame controller 90, which can control access to independent first and second image memories. Multiprocessor integrated circuit 100 provides a high degree of operation parallelism, which will be useful in image processing and graphics operations, such as in the multi-media computing.

Multiprocessor integrated circuit 100 includes two random access memories. Random access memory 10 is primarily devoted to master processor 60. It includes two instruction cache memories 11 and 12, two data cache memories 13 and 14 and a parameter memory 15. These memory sections can be physically identical, but connected and used differently. Random access memory 20 may be accessed by master processor 60 and each of the digital image/graphics processors 71, 72, 73 and 74. Each digital image/graphics processor 71, 72, 73 and 74 has five corresponding memory sections. These include an instruction cache memory, three data memories and one parameter memory. Thus digital image/graphics processor 71 has corresponding instruction cache memory 21, data memories 22, 23, 24 and parameter memory 25; digital image/graphics processor 72 has corresponding instruction cache memory 26, data memories 27, 28, 29 and parameter memory 30; digital image/graphics processor 73 has corresponding instruction cache memory 31, data memories 32, 33, 34 and parameter memory 35; and digital image/graphics processor 74 has corresponding instruction cache memory 36, data memories 37, 38, 39 and parameter memory 40. Like the sections of random access memory 10, these memory sections can be physically identical but connected and used differently. Each of these memory sections of memories 10 and 20 preferably includes 2 K bytes, with a total memory within multiprocessor integrated circuit 100 of 50 K bytes.

Multiprocessor integrated circuit 100 is constructed to provide a high rate of data transfer between processors and memory using plural independent parallel data transfers. Crossbar 50 enables these data transfers. Each digital image/graphics processor 71, 72, 73 and 74 has three memory ports that may operate simultaneously each cycle. An instruction port (I) may fetch 64 bit instruction words from the corresponding instruction cache. A local data port (L) may read a 32 bit data word from or write a 32 bit data word into the data memories or the parameter memory corresponding to that digital image/graphics processor. A global data port (G) may read a 32 bit data word from or write a 32 bit data word into any of the data memories or the parameter memories of random access memory 20. Master processor 60 includes two memory ports. An instruction port (I) may fetch a 32 bit instruction word from either of the instruction caches 11 and 12. A data port (C) may read a 32 bit data word from or write a 32 bit data word into data caches 13 or 14, parameter memory 15 of random access memory 10 or any of the data memories, the parameter memories or random access memory 20. Transfer controller 80 can access any of the sections of random access memory 10 or 20 via data port (C). Thus fifteen parallel memory accesses may be requested at any single memory cycle. Random access memories 10 and 20 are divided into 25 memories in order to support so many parallel accesses.

Crossbar 50 controls the connections of master processor 60, digital image/graphics processors 71, 72, 73 and 74, and transfer controller 80 with memories 10 and 20. Crossbar 50 includes a plurality of crosspoints 51 disposed in rows and columns. Each column of crosspoints 51 corresponds to a single memory section and a corresponding range of addresses. A processor requests access to one of the memory sections through the most significant bits of an address output by that processor. This address output by the processor travels along a row. The crosspoint 51 corresponding to the memory section having that address responds either by granting or denying access to the memory section. If no other processor has requested access to that memory section during the current memory cycle, then the crosspoint 51 grants access by coupling the row and column. This supplies the address to the memory section. The memory section responds by permitting data access at that address. This data access may be either a data read operation or a data write operation.

If more than one processor requests access to the same memory section simultaneously, then crossbar 50 grants access to only one of the requesting processors. The crosspoints 51 in each column of crossbar 50 communicate and grant access based upon a priority hierarchy. If two requests for access having the same rank occur simultaneously, then crossbar 50 grants access on a round robin basis, with the processor last granted access having the lowest priority. Each granted access lasts as long as needed to service the request. The processors may change their addresses every memory cycle, so crossbar 50 can change the interconnection between the processors and the memory sections on a cycle by cycle basis.

Master processor 60 preferably performs the major control functions for multiprocessor integrated circuit 100. Master processor 60 is preferably a 32 bit reduced instruction set computer (RISC) processor including a hardware floating point calculation unit. According to the RISC architecture, all accesses to memory are performed with load and store instructions and most integer and logical operations are performed on registers in a single cycle. The floating point calculation unit, however, will generally take several cycles to perform operations when employing the same register file as used by the integer and logical unit. A register score board ensures that correct register access sequences are maintained. The RISC architecture is suitable for control functions in image processing. The floating point calculation unit permits rapid computation of image rotation functions, which may be important to image processing.

Master processor 60 fetches instruction words from instruction cache memory 11 or instruction cache memory 12. Likewise, master processor 60 fetches data from either data cache 13 or data cache 14. Since each memory section includes 2 K bytes of memory, there is 4 K bytes of instruction cache and 4 K bytes of data cache. Cache control is an integral function of master processor 60. As previously mentioned, master processor 60 may also access other memory sections via crossbar 50.

Figure 3:
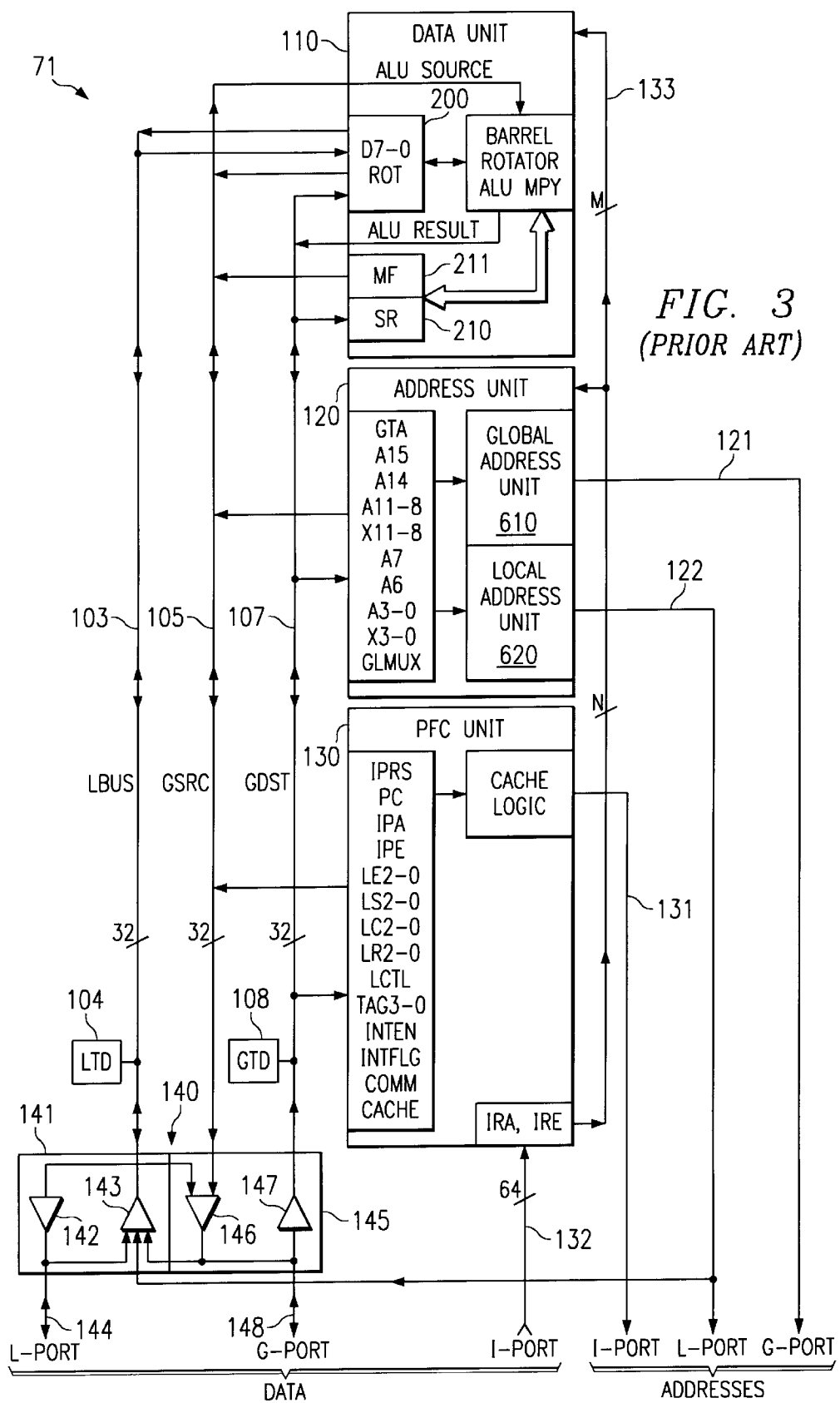
FIG. 3 illustrates in block diagram form one of the digital image/graphics processors illustrated in FIG. 2.

The four digital image/graphics processors 71, 72, 73 and 74 each have a highly parallel digital signal processor (DSP) architecture. FIG. 3 illustrates an overview of exemplary digital image/graphics processor 71, which is identical to digital image/graphics processors 72, 73 and 74. Digital image/graphics processor 71 achieves a high degree of parallelism of operation employing three separate units: data unit 110; address unit 120; and program flow control unit 130. These three units operate simultaneously on different instructions in an instruction pipeline. In addition each of these units contains internal parallelism.

The digital image/graphics processors 71, 72, 73 and 74 can execute independent instruction streams in the multiple instruction multiple data mode (MIMD). In the MIMD mode, each digital image/graphics processor executes an individual program from its corresponding instruction cache, which may be independent or cooperative. In the latter case crossbar 50 enables inter-processor communication in combination with the shared memory. Digital image/graphics processors 71, 72, 73 and 74 may also operate in a synchronized MIMD mode. In the synchronized MIMD mode, the program control flow unit 130 of each digital image/graphics processor inhibits fetching the next instruction until all synchronized processors are ready to proceed. This synchronized MIMD mode allows the separate programs of the digital image/graphics processors to be executed in lock step in a closely coupled operation.

Digital image/graphics processors 71, 72, 73 and 74 can execute identical instructions on differing data in the single instruction multiple data mode (SIMD). In this mode a single instruction stream for the four digital image/graphics processors comes from instruction cache memory 21. Digital image/graphics processor 71 controls the fetching and branching operations and crossbar 50 supplies the same instruction to the other digital image/graphics processors 72, 73 and 74. Since digital image/graphics processor 71 controls instruction fetch for all the digital image/graphics processors 71, 72, 73 and 74, the digital image/graphics processors are inherently synchronized in the SIMD mode.

Transfer controller 80 is a combined direct memory access (DMA) machine and memory interface for multiprocessor integrated circuit 100. Transfer controller 80 intelligently queues, sets priorities and services the data requests and cache misses of the five programmable processors. Master processor 60 and digital image/graphics processors 71, 72, 73 and 74 all access memory and systems external to multiprocessor integrated circuit 100 via transfer controller 80. Data cache or instruction cache misses are automatically handled by transfer controller 80. The cache service (S) port transmits such cache misses to transfer controller 80. Cache service port (S) reads information from the processors and not from memory. Master processor 60 and digital image/graphics processors 71, 72, 73 and 74 may request data transfers from transfer controller 80 as linked list packet requests. These linked list packet requests allow multi-dimensional blocks of information to be transferred between source and destination memory addresses, which can be within multiprocessor integrated circuit 100 or external to multiprocessor integrated circuit 100. Transfer controller 80 preferably also includes a refresh controller for dynamic random access memory (DRAM) which require periodic refresh to retain their data.

Frame controller 90 is the interface between multiprocessor integrated circuit 100 and external image capture and display systems. Frame controller 90 provides control over capture and display devices, and manages the movement of data between these devices and memory automatically. To this end, frame controller 90 provides simultaneous control over two independent image systems. These would typically include a first image system for image capture and a second image system for image display, although the application of frame controller 90 is controlled by the user. These image systems would ordinarily include independent frame memories used for either frame grabber or frame buffer storage. Frame controller 90 preferably operates to control video dynamic random access memory (VRAM) through refresh and shift register control.

Multiprocessor integrated circuit 100 is designed for large scale image processing. Master processor 60 provides embedded control, orchestrating the activities of the digital image/graphics processors 71, 72, 73 and 74, and interpreting the results that they produce. Digital image/graphics processors 71, 72, 73 and 74 are well suited to pixel analysis and manipulation. If pixels are thought of as high in data but low in information, then in a typical application digital image/graphics processors 71, 72, 73 and 74 might well examine the pixels and turn the raw data into information. This information can then be analyzed either by the digital image/graphics processors 71, 72, 73 and 74 or by master processor 60. Crossbar 50 mediates inter-processor communication. Crossbar 50 allows multiprocessor integrated circuit 100 to be implemented as a shared memory system. Message passing need not be a primary form of communication in this architecture. However, messages can be passed via the shared memories. Each digital image/graphics processor, the corresponding section of crossbar 50 and the corresponding sections of memory 20 have the same width. This permits architecture flexibility by accommodating the addition or removal of digital image/graphics processors and corresponding memory modularly while maintaining the same pin out.

In the preferred embodiment all parts of multiprocessor integrated circuit 100 are disposed on a single integrated circuit. In the preferred embodiment, multiprocessor integrated circuit 100 is formed in complementary metal oxide semiconductor (CMOS) using feature sizes of 0.6 $\mu$m.

Multiprocessor integrated circuit 100 is preferably constructed in a pin grid array package having 256 pins. The inputs and outputs are preferably compatible with transistor-transistor logic (TTL) logic voltages. Multiprocessor integrated circuit 100 preferably includes about 3 million transistors and employs a clock rate of 50 MHZ.

FIG. 3 illustrates an overview of exemplary digital image/graphics processor 71, which is virtually identical to digital image/graphics processors 72, 73 and 74. Digital image/graphics processor 71 includes: data unit 110; address unit 120; and program flow control unit 130. Data unit 110 performs the logical or arithmetic data operations. Data unit 110 includes eight data registers D7–D0, a status register 210 and a multiple flags register 211. Address unit 120 controls generation of load/store addresses for the local data port and the global data port. As will be further described below, address unit 120 includes two virtually identical addressing units, one for local addressing and one for global addressing. Each of these addressing units includes an all "0" read only register enabling absolute addressing in a relative address mode, a stack pointer, five address registers and three index registers. The addressing units share a global bit multiplex control register used when forming a merging address from both address units. Program flow control unit 130 controls the program flow for the digital image/graphics processor 71 including generation of addresses for instruction fetch via the instruction port. Program flow control unit 130 includes; a program counter PC; an instruction pointer-address stage IRA that holds the address of the instruction currently in the address pipeline stage; an instruction pointer-execute stage IRE that holds the address of the instruction currently in the execute pipeline stage; an instruction pointer-return from subroutine IPRS holding the address for returns from subroutines; a set of registers controlling zero overhead loops; four cache tag registers TAG3–TAG0 collectively called 708 that hold the most significant bits of four blocks of instruction words in the corresponding instruction cache memory.

Digital image/graphics processor 71 operates on a three stage pipeline as illustrated in FIG. 4. Data unit 110, address unit 120 and program flow control unit 130 operate simultaneously on different instructions in an instruction pipeline. The three stages in chronological order are fetch, address and execute. Thus at any time, digital image/graphics processor 71 will be operating on differing functions of three instructions. The phrase pipeline stage is used instead of referring to clock cycles, to indicate that specific events occur when the pipeline advances, and not during stall conditions.

Program flow control unit 130 performs all the operations that occur during the fetch pipeline stage. Program flow control unit 130 includes a program counter, loop logic, interrupt logic and pipeline control logic. During the fetch pipeline stage, the next instruction word is fetched from memory. The address contained in the program counter is compared with cache tag registers to determine if the next instruction word is stored in instruction cache memory 21. Program flow control unit 130 supplies the address in the program counter to the instruction port address bus 131 to fetch this next instruction word from instruction cache memory 21 if present. Crossbar 50 transmits this address to the corresponding instruction cache, here instruction cache memory 21, which returns the instruction word on the instruction bus 132. Otherwise, a cache miss occurs and transfer controller 80 accesses external memory to obtain the next instruction word. The program counter is updated. If the following instruction word is at the next sequential address, program control flow unit 130 post increments the program counter. Otherwise, program control flow unit 130 loads the address of the next instruction word according to the loop logic or software branch. If the synchronized MIMD mode is active, then the instruction fetch waits until all the specified digital image/graphics processors are synchronized, as indicated by sync bits in a communications register.

Address unit 120 performs all the address calculations of the address pipeline stage. Address unit 120 includes two independent address units, one for the global port and one for the local port. If the instruction calls for one or two memory accesses, then address unit 120 generates the address(es) during the address pipeline stage. The address (es) are supplied to crossbar 50 via the respective global port address bus 121 and local port address bus 122 for contention detection/prioritization. If there is no contention, then the accessed memory prepares to allow the requested access, but the memory access occurs during the following execute pipeline stage.

Data unit 110 performs all of the logical and arithmetic operations during the execute pipeline stage. All logical and arithmetic operations and all data movements to or from memory occur during the execute pipeline stage. The global data port and the local data port complete any memory accesses, which are begun during the address pipeline stage, during the execute pipeline stage. The global data port and the local data port perform all data alignment needed by memory stores, and any data extraction and sign extension needed by memory loads. If the program counter is specified as a data destination during any operation of the execute pipeline stage, then a delay of two instructions is experienced before any branch takes effect. The pipelined operation requires this delay, since the next two instructions following such a branch instruction have already been fetched. According to the practice in RISC processors, other useful instructions may be placed in the two delay slot positions.

Digital image/graphics processor 71 includes three internal 32 bit data busses. These are local port data bus Lbus 103, global port source data bus Gsrc 105 and global port destination data bus Gdst 107. These three buses interconnect data unit 110, address unit 120 and program flow control unit 130. These three buses are also connected to a data port unit 140 having a local port 141 and global port 145. Data port unit 140 is coupled to crossbar 50 providing memory access.

Local data port 141 has a buffer 142 for data stores to memory. A multiplexer/buffer circuit 143 loads data onto Lbus 103 from local port data bus 144 from memory via crossbar 50, from a local port address bus 122 or from global port data bus 148. Local port data bus Lbus 103 thus carries 32 bit data that is either register sourced (stores) or memory sourced (loads). Advantageously, arithmetic results in address unit 120 can be supplied via local port address bus 122, multiplexer buffer 143 to local port data bus Lbus 103 to supplement the arithmetic operations of data unit 110. This will be further described below. Buffer 142 and multiplexer buffer 143 perform alignment and extraction of data. Local port data bus Lbus 103 connects to data registers in data unit 110. A local bus temporary holding register LTD 104 is also connected to local port data Lbus 103.

Global port source data bus Gsrc 105 and global port destination data bus Gdst 107 mediate global data transfers. These global data transfers may be either memory accesses, register to register moves or command word transfers between processors. Global port source data bus Gsrc 105 carries 32 bit source information of a global port data transfer. The data source can be any of the registers of digital image/graphics processor 71 or any data or parameter memory corresponding to any of the digital image/graphics processors 71, 72, 73 or 74. The data is stored to memory via the global port 145. Multiplexer buffer 146 selects lines from local port data Lbus 103 or global port source data bus Gsrc 105, and performs data alignment. Multiplexer buffer 146 writes this data onto global port data bus 148 for application to memory via crossbar 50. Global port source data bus Gsrc 105 also supplies data to data unit 110, allowing the data of global port source data bus Gsrc 105 to be used as one of the arithmetic logic unit sources. This latter connection allows any register of digital image/graphics processor 71 to be a source for an arithmetic logic unit operation.

Global port destination data bus Gdst 107 carries 32 bit destination data of a global bus data transfer. The destination is any register of digital image/graphics processor 71. Buffer 147 in global port 145 sources the data of global port destination data bus Gdst 107. Buffer 147 performs any needed data extraction and sign extension operations. This buffer 147 operates if the data source is memory, and a load is thus being performed. The arithmetic logic unit result serves as an alternative data source for global port destination data bus Gdst 107. This allows any register of digital image/graphics processor 71 to be the destination of an arithmetic logic unit operation. A global bus temporary holding register GTD 108 is also connected to global port destination data bus Gdst 107.

Circuitry including multiplexer buffers 143 and 146 connect between global port source data bus Gsrc 105 and global port destination data bus Gdst 107 to provide register to register moves. This allows a read from any register of digital image/graphics processor 71 onto global port source data bus Gsrc 105 to be written to any register of digital image/graphics processor 71 via global port destination data bus Gdst 107.

Note that it is advantageously possible to perform a load of any register of digital image/graphics processor 71 from memory via global port destination data bus Gdst 107, while simultaneously sourcing the arithmetic logic unit in data unit 110 from any register via global port source data bus Gsrc 105. Similarly, it is advantageously possible to store the data in any register of digital image/graphics processor 71 to memory via global port source data bus Gsrc 105, while saving the result of an arithmetic logic unit operation to any register of digital image/graphics processor 71 via global port destination data bus Gdst 107. The usefulness of these data transfers will be further detailed below.

Program flow control unit 130 receives the instruction words fetched from instruction cache memory 21 via instruction bus 132. This fetched instruction word is advantageously stored in two 64 bit instruction registers designated instruction register-address stage IRA and instruction register-execute stage IRE. Each of the instruction registers IRA and IRE have their contents decoded and distributed. Digital image/graphics processor 71 includes opcode bus 133 that carries decoded or partially decoded instruction contents to data unit 110 and address unit 120. As will be later described, an instruction word may include a 32 bit, a 15 bit or a 3 bit immediate field. Program flow control unit 130 routes such an immediate field to global port source data bus Gsrc 105 for supply to its destination.

Digital image/graphics processor 71 includes three address buses 121, 122 and 131. Address unit 120 generates addresses on global port address bus 121 and local port address bus 122. As will be further detailed below, address unit 120 includes separate global and local address units, which provide the addresses on global port address bus 121 and local port address bus 122, respectively. Note that local address unit 620 may access memory other than the data memory corresponding to that digital image/graphics processor. In that event the local address unit access is via global port address bus 121. Program flow control unit 130 sources the instruction address on instruction port address bus 131 from a combination of address bits from a program counter and cache control logic. These address buses 121, 122 and 131 each carry address, byte strobe and read/write information.

Figure 5:
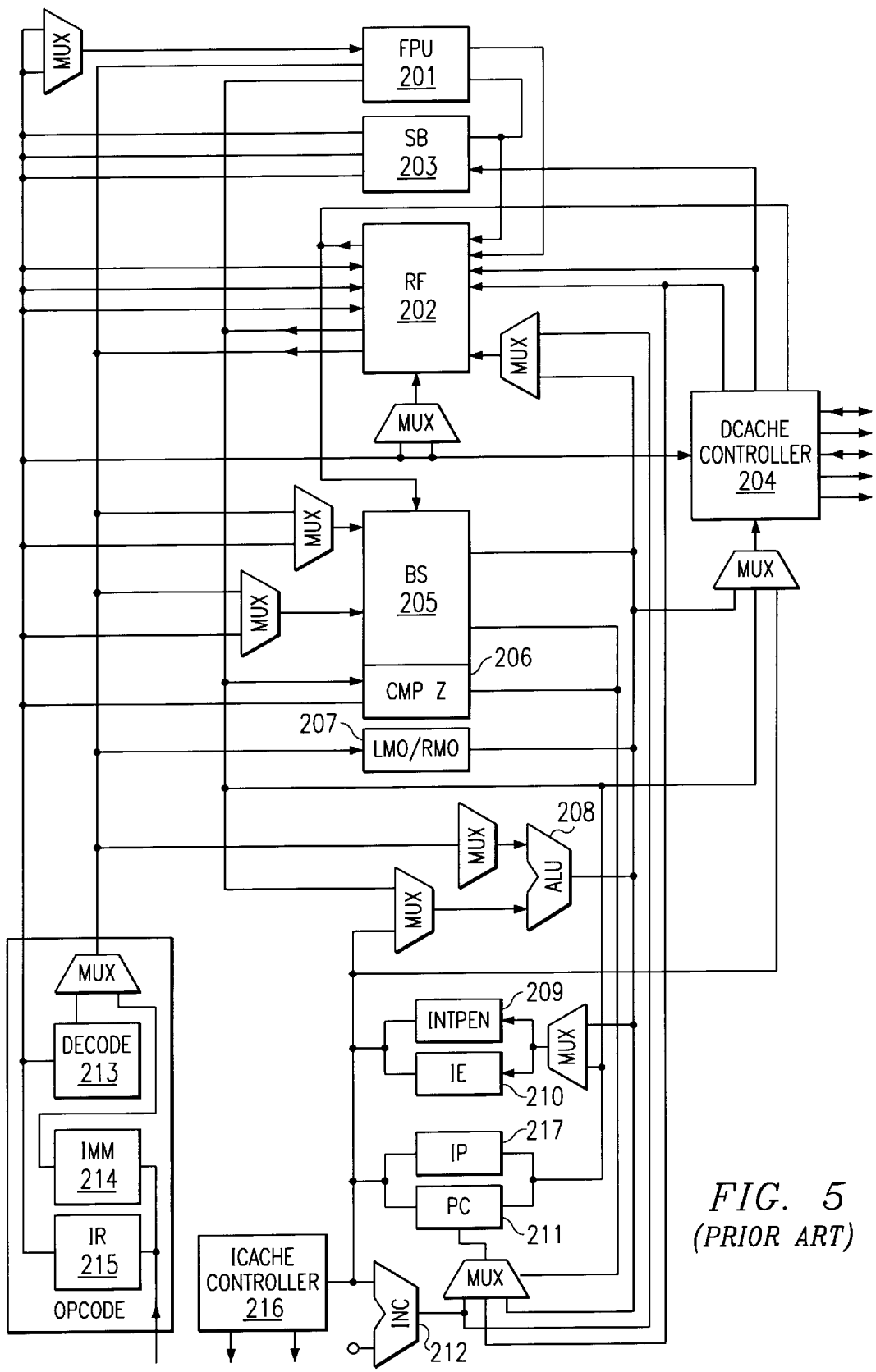
FIG. 5 illustrates the architecture of the master processor in the preferred embodiment of this invention.

FIG. 5 shows a simplified diagram of master processor 60. Major blocks of master processor 60 are: a floating point unit (FPU) 201; a register file (RF) 202; a register scoreboard (SB) 203 that ensures results of floating point operations and memory loads are available before they are used as sources and arbitrates between data cache and floating point unit 201 for access to their shared write port to register file 202; a data cache controller 204 which also handles the interface to the on-chip memory via the crossbar and to external memory via transfer processor 80; a barrel shifter (BS) 205 that performs shift instructions; compare to zero logic 206; left most one/right most one detection logic (LMO/RMO) 207; integer arithmetic logic unit (ALU) 208 used for add, subtract and logical operations and to compute branch target address during relative branches; interrupt pending register (INTPEN) 209 that receives master processor interrupt signals; interrupt enable register (IE) 220 that selectively enables or disables interrupts; program counter register (PC) 221 holds the address of the instruction to be fetched; program counter incrementer (INC) 212 that increments program counter 221 to point to the next instruction, with the incremented value can also be routed to the register file as a "return" or "link" address; instruction decode logic (DECODE) 213 that decodes instruction and supplies control signals to the operating units; instruction register (IR) 214 that holds the address of the instruction being executed; immediate register (IMM) 215 that stores any instruction immediate data; and the instruction cache controller (ICACHE) 216, that provides instructions to be executed, interfaces to transfer processor 80 for cache fills.

FIG. 6 shows the basic pipeline used in master processor 60. Master processor 60 has a three stage pipeline including fetch, execute and memory stages. FIG. 6 shows how three instructions through the pipeline. During the fetch stage of the pipeline program counter 221 is used to address the instruction cache and read a 32 bit instruction. During the execute stage the instruction is decoded, the source operands read from the register file, the operation performed, and a result written back to the register file. The memory stage is only present for load and store operations. The address calculated during the execute stage is used to address the data cache and the data are read or written. If a miss occurs on the instruction cache, the fetch and execute pipelines are stalled until the request can be serviced. If a miss occurs on the data cache, the memory pipeline stalls, but the fetch and execute pipelines continue to flow, until another memory operation needs to be initiated.

FIG. 7 shows the basic pipeline for floating point unit 201. The fetch stage is the same as the fetch stage of integer operations previously described. During the unpack stage of a floating point instruction, all data necessary to begin the floating point operation arrives including source operands, opcode, precisions and destination address. The two source operands are read from the register file. Operands are then unpacked into sign, exponent, mantissa fields and the detection of special cases takes place. Input exceptions are detected in this cycle. And input exceptions will be piped through floating point unit 201 and will be signaled on the same cycle as a single precision output exception. The other special cases involving signaling not-a-number, quiet not-a-number, infinity, denormal, and zero, are also detected and this information, which is not visible to user, will follow the data through the different pipeline stages of floating point unit 201.

All computation takes place during the operate stage. Depending on the type of instruction, several cycles in the operate stage may be required.

Output exceptions are detected in the final normalize stage. When floating point unit 201 result is determined, some of the individual information about this floating point operation is recorded in a floating point status register. Any floating point instruction writes to the floating point status register once and only once.

Figure 8:
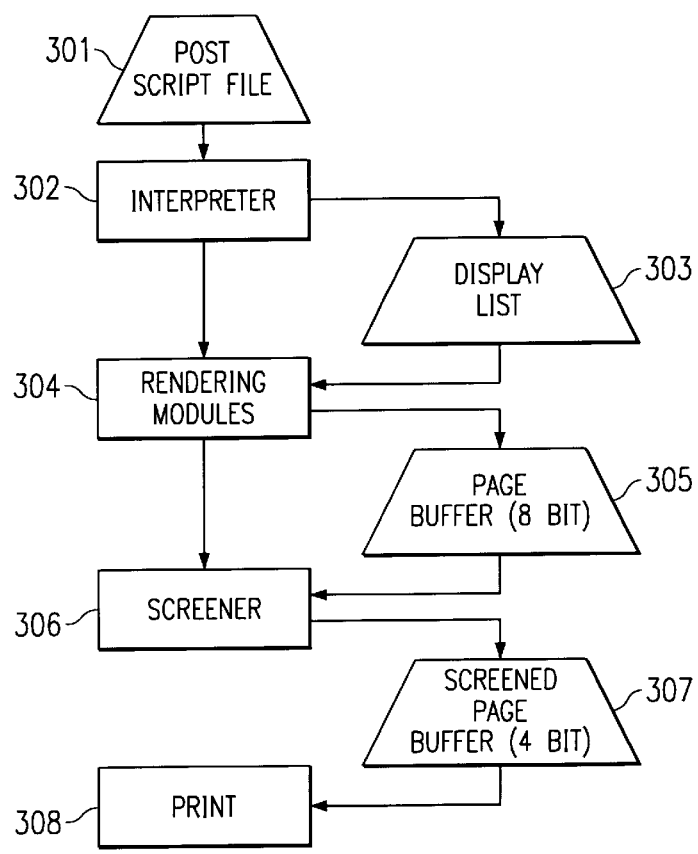
FIG. 8 illustrates the steps typically executed when printing a document specified in a page description language.

FIG. 8 illustrates the steps typically executed when a document specified in a page description language, such as PostScript, is to be printed. Following receipt of the print file (input data file 301) is interpretation (processing block 302). In this step, the input PostScript file is interpreted and converted into an intermediate form called the display list (data file 303). The display list 303 consists of a list of low level primitives such as trapezoids, fonts, images, etc. that make up the described page. Next the display list is rendered (processing block 304). Each element in the display list 303 is processed in this step and the output is written into a buffer known as the page buffer (data file 305). The page buffer 305 represents a portion of the output image for a particular color plane. In the page buffer 305, each pixel is typically represented by 8 bits. After all the elements in display list 303 have been processed, page buffer 305 contains the output image in an 8 bit format. Next the page buffer is screened (processing block 306). The resolution supported by the printing device may be anywhere between 1 to 8 bits per pixel. Page buffer 305 developed in the rendering step 304 has to be converted into the resolution supported by the printer. The thus converted data is called the device image. Each pixel in page buffer 305 has to be converted to its corresponding device pixel value. For instance, in the case of a 4 bit device pixel, each pixel in page buffer 305 has to be converted to a 4 bit value. This process called screening results in a screened page buffer (data file 307). Next comes printing (processing block 308). Each pixel in the screened page buffer 307 is printed on the paper. This process is repeated for all the color planes, cyan, yellow, magenta and black.

Each page in the output of a typical page is made of 8 inches times 11.5 inches. If the print density is 600 pixels per inch, then the page includes 33 million pixels. Each pixel needs to be screened. Assuming it takes T time units to screen a pixel, this amounts to a time of 33 million T units to screen a complete page for a particular color plane. The problem with this approach is that pixels whose values are 0, that is, pixels that are not the output of any rendering module, are also screened. In a typical page, the percentage of useful pixels is only a fraction of total number of pixels. Thus many pixels have the value 0. Table 1 lists estimates of the percentage of used print area for various page types.

TABLE 1

| Page Type | % Print Area |
|---|---|
| standard text | 30% |
| text and graphics | 40% |
| text, graphics and image | 80% |

Assuming only 40% of the page is written by the rendering modules, 60% of the page is screened unnecessarily. This amounts to 60% of 33 Million or 19.8 Million T units employed in useless screening. In the case of text pages, only about 30% of the page contains the print area. Thus for a text page 70% of screening time is wasted on the blank area. There is a large potential gain in processing performance by not screening these blank areas. The potential gain in the case of a page containing graphic and image information is smaller but still significant.

The method of this invention overcomes this disadvantage. This invention distinguishes between blank areas and print areas in the page by one of two methods. The first method screens only areas within bounding boxes of the display list elements. The second method identifies scan lines having print pixels.

Figure 9:
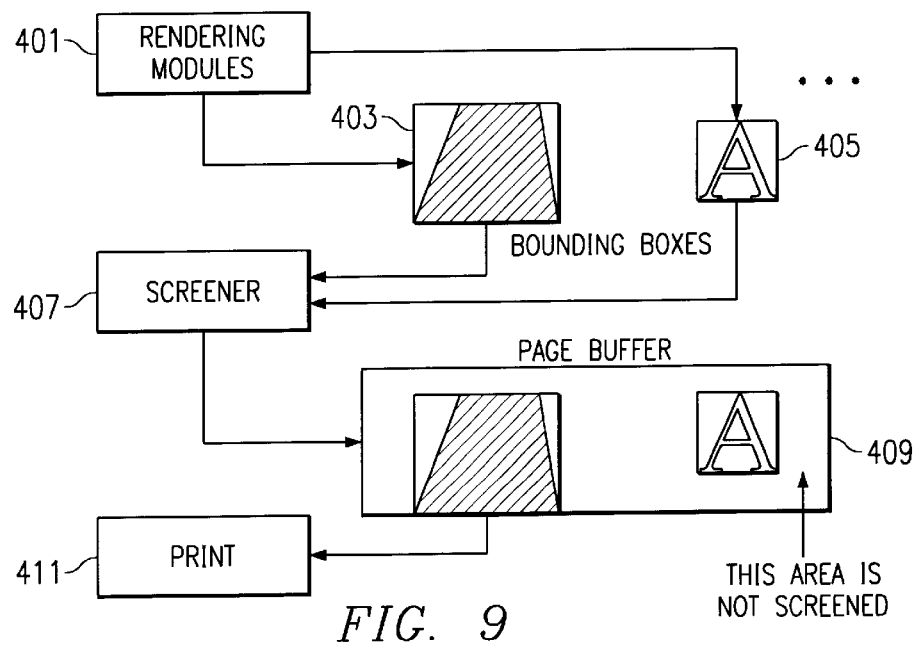
FIG. 9 illustrates an example of application of the bounding box method.

FIG. 9 illustrates an example of application of the bounding box method to distinguish useful and blank print areas. Each rendering module 401 prepares a bounding box that encloses the rendered object. For instance, a rendering module 401 processing a trapezoid element will prepare a bounding box 403 which encloses the trapezoid it has written to the page buffer. Similarly, a font rendering module 401 will also prepare a bounding box 405 for its input character in the rendered font.

The output of each rendering module 401 will be the rendered element in the page buffer plus the parameters of the bounding box that contains the rendered element. After the display list is processed, a list of such bounding boxes is given to the screening module 407. The screening module 407 considers each bounding box 403 and 405. The screening module 407 screens only the pixels in the bounding box and writes the output into the 4 bit output page buffer 409 for the print operation 411.

FIG. 10 illustrates an example of application of the scan line method to distinguish useful and blank print areas. There can be a problem in preparing a bounding box for individual modules and screening individual bounding boxes for each rendered object. For a complex figure, there may be many small overlapping bounding boxes. Kerned text may also result in overlapping bounding boxes. Thus the bounding box method may not eliminate much area. Moreover, most screening implementations are efficient when they operate on long, contiguous data such as an entire scan line. In such cases, the bounding box method may be less efficient.

The scan line method permits screening whole scan lines but only the scan lines in the image containing the useful pixels. Only the scan lines that intersect rendered objects are screened. A data structure, such as an array, indicates whether a scan line is to be screened. Each scan line has an entry in this array. A value of 0 means the scan line is not to be screened and a value of 1 means it is to be screened. In the scan line method there are two outputs after the complete page is rendered by the rendering module. The first output is the rendered page containing all the rendered modules. Each pixel in this rendered page is 8 bits. The second output is the scan line array having a number of elements equal to the number of scan lines in the page. Each element here contains a 1 or a 0 indicating whether the scan line needs to be screened or not.

Consider the example page illustrated in FIG. 10. This page has a trapezoid starting at line 10 and ending at line 15 and a character in a rendered font starting at line 14 and ending at line 31. All elements in the scan line array are initialized to 0. As rendering proceeds, the rendering module 501 writes a 1 into this scan line array at locations where an object is rendered corresponding to the lines that need to be screened. In this example the scan line array thus contains: 0 for scan lines 0 to 9; 1 for scan lines 10 to 31; and 0 for scan lines 32 or greater. The screening module 503 receives these inputs and screens only those lines for which the scan line array is 1, that is scan lines 10 to 31. The screened scan lines are printed in print operation 503.

This implementation is simple. It requires only a few changes in the implementation of the rendering modules and the screener. This method will be very useful for text images since there are many empty scan lines. Since only the non-empty scan lines are screened, there is a considerable savings in time.

FIG. 11 illustrates the structure of the three dimensional lookup table typically used in prior art screening. The pixel location expressed in X and Y coordinates is modulo indexed into an M by N preference matrix. Thus the pixel X coordinate selects a row of the preference matrix at X modulo M. In the same way the pixel Y coordinate selects a column of the preference matrix at Y modulo N.

FIG. 12 is an example of a 4 by 4 preference matrix. The data at the accessed location within the preference matrix points to one of a set of lookup tables. Each element in the preference matrix represents an lookup table number. The example preference matrix of FIG. 12 uses four distinct lookup tables. A pixel indexing to element (0,0) in the preference matrix will use a first lookup table LUT[0]. A pixel indexing to (0,1) in the preference matrix will use LUT[1]. A pixel indexing to (0,2) in the preference matrix will use lookup table[1] A pixel indexing to (0,3) in the preference matrix will use LUT[2]. Thus the preference matrix specifies the lookup table used for image screening for pixels of the input image. Similarly, lookup tables are computed for pixels from (1,0) to (1,3), (2,0) to (2,3) and (3,0) to (3,3). In the 4 by 4 preference matrix example of FIG. 12, for a given pixel at (X,Y) the preference matrix element at (X modulo 4, Y modulo 4) selects the lookup table used. Thus the lookup table for a pixel at (0,5), which indexes to (0,1), is LUT[1]. The lookup table for a pixel at (7,8), which indexes to (3,0) is LUT[0]. The input pixel location is thus mapped on to the preference matrix for selection of the appropriate lookup table.

Referring back to FIG. 11, the modulo indexing selects one of a set of lookup tables. The pixel gray scale value is the index into this selected lookup table. If the pixel has b-bits, then each lookup table has $2^b$ entries. Each entry includes data of c-bits within the dynamic range of the print device contain the corresponding screened output pixel of size c-bits. Thus the screened value V of a pixel at (x,y) is given by:

V=LUT[preference_matrix[x % m] [y % n] [image [x] [y]]

This prior art technique puts some demands on available on-chip memory. The preference matrix has a maximum row size of 512. This requires an area of 1 Kbytes in the on-chip memory including memory to take care of odd preference matrix row dimension addressed in the next section. The processor integrated circuit requires buffers for input and output. Employing two buffers for input/output and allocating 2 Kbytes for I/O buffer requires 4 Kbytes of memory. When employing multiprocessor integrated circuit 100 described above about 0.5 Kbytes are required as parameters space for definitions of transfer requests. These memory requirements total about 5.5 Kbytes. When employing the digital image/graphics processors 71, 72, 73 and 73 of multiprocessor integrated circuit 100 of space, these memory requirements leave only about 2 Kbytes for the lookup tables. This means that a maximum of 8 lookup tables can be present on the on-chip memory of digital image/graphics processors 71, 72, 73 and 73.

Many practical embodiments employ 4 bit data in the printer device image. Most data processors provide a minimum addressable unit of 8 bits or one byte. Thus two of the 4-bit pixels are processed at a time and are packed into a single byte output. If the preference matrix has an even number of elements per row, this poses no problem. Consider a preference matrix of row dimension 6. Screened output of pixels 0 and 1 are written at output address 0, pixels 2 and 3 will be written at output address 1, pixels 4 and 5 will be written at output address 2.

FIG. 13 illustrates the problem of the prior art for the case of a preference matrix having a row dimension of an odd number of elements. In this example the preference matrix has a row dimension of 3. When packing nibbles into bytes, there is a problem with an odd number of elements. The screened output of pixels 0 and 1 are written at output address 0. When processing pixel 2, it produces a single 4 bit output. This cannot be written independently in the output memory because the output memory is byte addressable and not 4-bit addressable. This special case requires extra processing for a read-modify-write operation which results in low performance.

FIG. 14 illustrates schematically a manner that the present invention proposes to solve this problem. A cache of lookup tables is maintained in the on-chip memory. As previously calculated, for multiprocessor integrated circuit 100 eight lookup tables can be keep in the on-chip memory at any one time. To facilitate this caching, the preference matrix rows are partitioned into preference segments. This eliminates the restriction on the maximum number of lookup tables.

The input image is processed one scan line at a time. Each row of the preference matrix is divided into preference segments of eight elements each. As illustrated in the example of FIG. 14, a preference matrix of row dimension 16 will be divided into preference segment 0, having elements 0 to 7, and preference segment 1, having elements 8 to 15. The current input line is processed in terms these of preference segments. The lookup tables pertaining to the first preference segment are brought into the on-chip memory and all pixels corresponding to this segment are processed and output. The process is repeated for the remaining preference segments in turn. Note that the memory organization of data memories associated with digital image/graphics processors 71, 72, 73 and 74 permit data transfers in units of these preference segments.

In the unsegmented processing, either a lot of time is wasted waiting for lookup tables to be transferred on-chip or all the distinct lookup tables are required to fit on-chip. The preference segment method of this invention allows enables screening by caching preference segments without any of these drawbacks.

For simplicity of processing, each entry in the lookup table contains 8 bits. When a preference segment is processed, 8 input elements are screened into 4 bytes. The output buffer is made up of such 4 byte segments. This reduces the bandwidth of transfer controller 80 to 50%. This is also because only 8 lookup tables can be accommodated on the on-chip memory. If 16 lookup table entries are 4 bit entries, 16 lookup tables can be cached. This will allow preference segments of 16 elements, resulting in 8 byte output which gives 100% utilization of transfer controller 80.

FIG. 15 illustrates the inventive method of handling preference matrices having a row dimension of an odd number. If the preference matrix row dimension is of odd size, then the preference matrix is doubled. This results in an even size. As illustrated in FIG. 15, six input pixels, each of 8 bits, are screened into six 4-bit nibbles and packed into six byte words. Doubling of the preference matrix is achieved by duplicating the preference matrix in that dimension. This doubles the tile size but each such tile is made up of two identical halves. The pixel dimension in the direction doubled is then indexed by modulo 2M rather than by modulo M. This doubling requires more space to store the preference table. However, this doubling reduces the complexity of computation and makes the computation uniform.

A brief description of this method if given in the form of pseudo-code below. In accordance with this example the input buffer size is 2 Kbytes and the output buffer size in 1 Kbyte.

```
//      Process one row of image at a time for row=0 to height
//      of the image
for row=0 to height of image
        pref_row_num=image_y% preference matrix height
        transfer preference matrix[pref_row_num]
        if the width of the preference matrix is odd,
        duplicate in the on-chip buffer
//      A preference row is divided into preference segments
//      each of length 8 entries. Input is processed in terms
//      of preference segments. pref_count indicates the
//      integral number of such preference segments in a
//      preference row.
        pref_count=pref_row_size/8
        for i=0 to pref_count-1
            get preference_segment[i]
            get LUTBLOCK[i]
            get input block corresponding to
                preference_segment [i]
            Screen the input
//      2 bytes are read from the input, screened into 4 bit
//      values These values are concatenated to form an 8 bit
//      value and written into the output buffer
        for (m=0; m<PAGE_WIDTH; m+=8)
            for (k=0; k<8; k+2)
                *output++ = (LUT[k] [input [m=k]] <<4) |
                    LUT [k+1] [input [m+k+1]
            end for
        transfer output of size PAGE_WIDTH/2
        end for
end for
```

This is implementation and uses only the resources of a single digital image/graphics processor 71, 72, 73 and 74 without encroaching into the resources of the other such processors. Screening is confined to a single of these processors and permitting the others to perform independently any other operations.

By a proper allocation of lookup tables, I/O buffers, preference matrix row within the on-chip memory, a double buffering scheme can be extended for the lookup tables and the preference matrix row. This would avoid waiting for the lookup tables to load when the next preference segment is to be processed and waiting for the preference matrix row to load when the next line is to be processed.

The fact that the screened output value is a nibble (4 bits) and the limitation that memory locations are byte (8 bits) addressable, dictates that the core method of screening processes two pixels at a time. Hence the core method of screening according to the prior art has the following steps:

Step 1: Screen the pixel pointed by input_pointer into 4 bits and hold in a first temporary memory location.
Step 2: Increment the input_pixel_pointer
Step 3: Increment the pref_pointer
Step 4: Screen the pixel pointed to by input_pointer into 4 bits and hold in a second temporary memory location
Step 5: Increment the input_pointer
Step 6: Increment the pref_pointer
Step 7: Pack the first and second temporary nibbles into 8 bits
Step 8: Store the packed value in the location pointed by output_pointer
Step 9: Increment the output_pointer The loop is set up to run for the entire line of pixels and the loop count is L/2, where the length of the line equals L. As the preference matrix pointer is incremented and checked within the loop for every pair of pixels, the tile size of the preference matrix has to be even. A single pointer (pointing to preference matrix row) wrapping around the array of size M for the case of even M can be used as such in loops. To extend the same concept for the case of an odd M requires the line to the tiled in modulo 2M. So that preference matrix pointer checks can be done for every pair of pixels and the core method of screening two pixels at a time can still be used.

FIG. 16 illustrates schematically the prior art method of indexing to the lookup table for screening with a preference matrix having an odd M. To screen a line of pixels by the prior art method for odd M, an outer loop running for the total number of pixels is set. Within this loop for every pair of pixels, the program checks for resetting the circular pointer to the start of the array whenever it reaches 2M is done. As shown in FIG. 16, when the loop_pref_pointer reaches pref-pointer_end, the loop_pref_pointer is reset to pref_pointer_start.

The prior art screening loop has the following steps:
Step 1: Set the loop_pref_pointer to pref_pointer_start
Step 2: for i=1 to i≦½ repeat steps 3 and 4
Step 3: [all the steps of core method of screening]
Step 4: Check if loop_pref_pointer equals pref_pointer_end If true reset the pointer to the start of the array i.e. set loop_pref pointer to pref_pointer-start else continue loop The same method is extended to the case of an even M of the preference matrix where the scan line is broken into tiles of modulus M and the loop is reset every M pixels, whenever the pointer reaches the pref_end_pointer. Note that pref_end pointer is set to pref_pointer_start+M−1. The screening loop has the same steps as the odd M case.

The above described prior art method has poor processing performance because the preference matrix modulo checking is done within the loop. This prior art method also requires an array of size 2M bytes to store the preference matrix on-chip in the case of odd M.

The proposed method of this invention attempts to alleviate the above mentioned problems by having no checks on the preference matrix pointer inside the loop. The proposed method also reduces the memory storage requirements of preference matrix for the case of odd M. This method uses the same core method of screening as the prior art. The proposed method of this invention tiles the line by the preference matrix row size M for even M or 2M for odd M and sets an outer loop and an inner loop. The outer loop runs for the number of M for even M or 2M for odd M tiles in the scan line. The inner loop consists of the core method of screening, running for M/2 pixels for even M or M pixels for odd M.

If a line does not start and end in a tile boundary, the line is broken into three parts. These are the start part until a tile (M or 2M) boundary, the end part from the last but one tile boundary till the end of the line and a middle part consisting of full tiles. Partial inner loops are set to screen the pixels in the start and end parts whereas the middle part is processed with outer and inner loops. For a line length less than the tile size partial inner loops are used. The method of having inner and outer loops for both odd and even M is described below.

Figure 17:
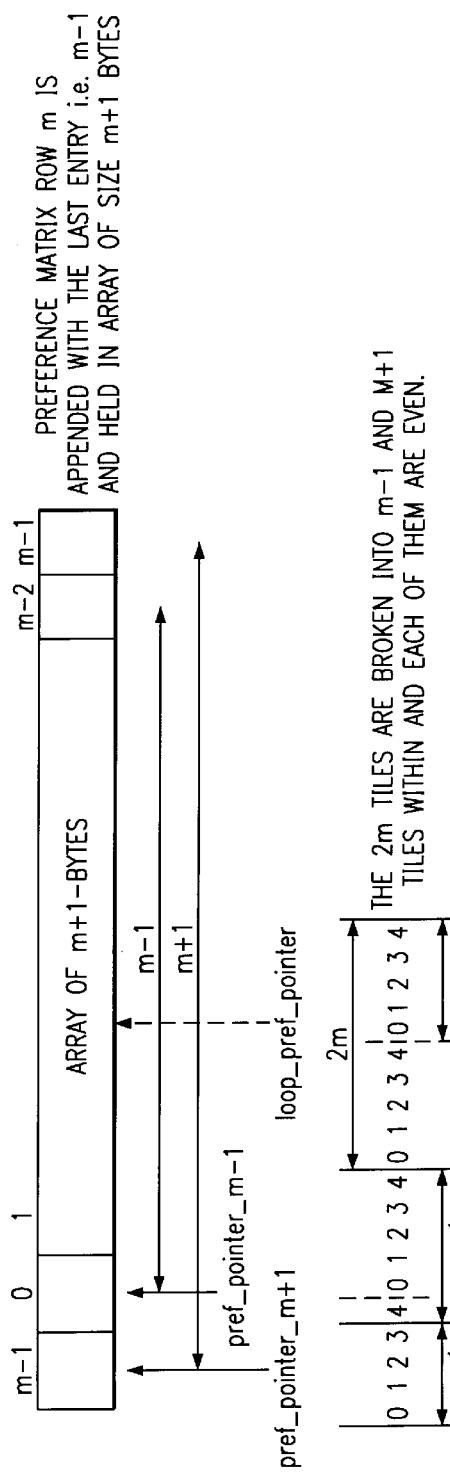
FIG. 17 illustrates schematically the inventive method of indexing to the lookup table for screening with a preference matrix having an odd M.

FIG. 17 illustrates schematically the inventive method of indexing to the lookup table for screening with a preference matrix having an odd M. The proposed method uses two pointers into the preference matrix array. The preference matrix is stored in an array of size M+1. The first entry of this array is the preference matrix row's M-th element which is followed by the M elements of the preference matrix row. The line is broken into 2M modulus tiles and the inner loop is broken into two loops, one running from 1 to M+1 pixels and other from 1 to M−1 pixels. These two inner loops use M+1 and M−1 preference matrix start pointers respectively at their entry. Since M+1 and M−1 are even when M is odd, inner loops running for (M+1)/2 and (M−1)/2 pairs of pixels can still use the same core method of screening. Within these loops the preference matrix pointers are only incremented. At the end of the loops the two preference matrix pointers are reset to the start of either the M+1 or the M−1 preference matrix array. The outer loop runs for the number of 2M tiles in the line.

Step 1: Calculate the number of tiles to be processed, tile_cnt=L/(2*M) gives the outer loop count Step 2: Set the loop_pref_pointer1 to pref_pointer_M−1_start Step 3: For k=1 to k≦tile_cnt repeat steps 4 to 9

Step 4: Reset the loop pref_pointer to pref_pointer_start_M−1

Step 5: For i=1 to i≦(M−1)/2 repeat step 6

Step 6: [All the steps of core method of screening]

Step 7: Set Loop_pref_pointer to pref_pointer_M+1

Step 8: For i=1 to i≦(M+1)/2 repeat step 9

Step 9: [All the steps of core method of screening]

When the line does not start and end in a 2M tile boundary, the start and the end part of the line would be processed separately. Their processing would have partial inner loops alone (no outer loops required) with the preference matrix pointer starting with M+1 or M−1 appropriately. The order of either M+1 or M−1 pointer depends on which part of 2M tile the line start falls.

The proposed method will have the line broken into tiles of modulo M which is even. There are two loops. An inner loop for M/2 pixels uses the core method of screening two pixels. An outer loop runs for the number of tiles in the line to be screened. There will be a pointer incremented within the inner loop which points to the start of the preference matrix array size M at the entry of the outer loop as well reset to point to the start of the preference matrix at the end of every inner loop.

The screening loop has the following steps:

Step 1: Calculate the number of tiles to be processed, tile_cnt=L/M gives the outer loop count Step 2: Set the loop_pref_pointer to pre_pointer_start Step 3: For k=1 to k≦tile_cnt repeat steps 4 to 6

Step 4: Reset the loop_pref_pointer to pref_pointer_start

Step 5: for i=1 to i≦M/2 repeat step 6

Step 6: [All the steps of core method of screening]

When the line does not start and end in a M tile boundary, the start and the end part of the line would be processed separately. Their processing would have partial inner loops alone (no outer loops required) with the preference matrix pointer pointing to the start entry.

The following are the results of analysis done to compute the performance of the proposed method over the current method. The comparison is done with instructions per pixel processing. An instruction in this analysis means an arithmetic or address operation. The terms used in this topic are:

$IPP_{CM}$=Total instruction per pixel using the prior art method

LOOP-$IPP_{CM}$ =Total instructions per pixel executed by the loop using the prior art method $LS_{CM}$=Setup instruction per pixel using the prior art method $IPP_{PM}$=Total instruction per pixel using inventive method LOOP-IPP-$O_{PM}$=Total instruction per pixel in a loop using the inventive method (M odd)

LOOP-IPP-$E_{PM}$=Total instructions per pixel in a loop using the inventive method (M even)

$LS_{PM}$=Setup instructions per pixel using inventive method

All the above terms are for a line of length L and a preference matrix row size of M.

For the prior art method:

$$IPP_{CM}=LOOP\text{-}IPP_{CM}+LS_{CM}$$

where: LOOP-IPPC=(1+(L/2)*11))/L; L/2 is the number of pairs of pixels; and the number of instructions within the loop for a pair of pixels is 11.

$$LS_{CM}=5/L$$

where: the number of instructions for setting up the pointer for the preference matrix (x mod M and y mod N) is 5.

For the inventive method for an odd M:

$$IPP_{CM}=LOOP\text{-}IPP\text{-}O_{PM}+LS_{PM}$$

where:

| | |
|---|---|
| LOOP-IPP-$O_{PM}$ = (2 + (L/M) + (L*9/2))/L | if L >> 2M |
| LOOP-IPP-$O_{PM}$ = (2 + L + (L*9/2))/L | if L < 2M | where: the number of instructions for a pair of pixels within the inner loop is 11; one instruction is for resetting the preference matrix pointer at the start of the array, that is the (M+1)th or (M−1)th array in the outer loop.

| | |
|---|---|
| $LS_{PM}$ = 20/L | if L > M |
| $LS_{PM}$ = 12/L | if L < M | where: the number of instructions for setting up the inner loop is 20 for L>M and 12 for L<M.

For the inventive method for an even M:

$$IPP_{PM}=LOOP\text{-}IPP\text{-}E_{PM}+LS_{PM}$$

where:

| | |
|---|---|
| LOOP-IPP-$E_{PM}$ = (2 + (L/M) + (L*9/2))/L | if L ≧ M |
| LOOP-IPP-$E_{PM}$ = (2 + L + (L*9/2))/L | if L < M | where: the number of instructions for a pair of pixels within the inner loop is 11; one instruction is for resetting the preference matrix pointer at the start of the array, that is the (M+1)th or (M−1)th array in the outer loop.

| | |
|---|---|
| $LS_{PM}$ = 20/L | if L > M |
| $LS_{PM}$ = 12/L | if L < M | where: the number of instructions for setting up the inner loop is 20 for L>M and 12 for L<M. Note that the setup instruction counts are based on a worse case set requirement. The loop counts assume zero overhead loop counters as supported by program flow control units 130 of digital image/graphics processors 71, 72, 73 and 74 and also widely supported by digital signal processors.

Figure 18:
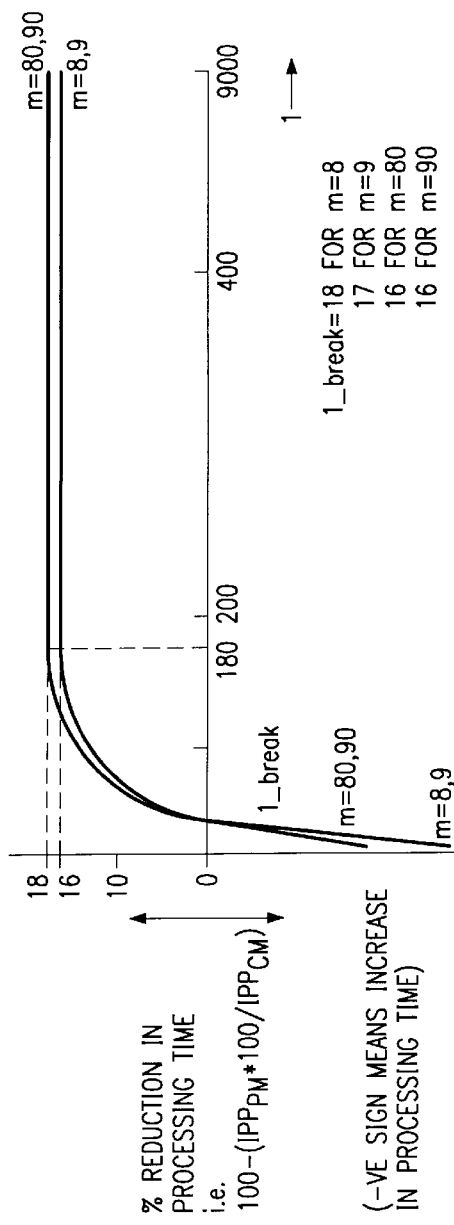
FIG. 18 is a plot of percentage reduction in processing time versus line length of the inventive method relative to the prior art method.

FIG. 18 is a plot of percentage reduction in processing time versus line length of the inventive method relative to the prior art method. In FIG. 18 processing time is assumed directly related to the number of instructions. FIG. 18 illustrates a plot of (100−($IPP_{PM}$*100)/$IPP_{CM}$)% for various line lengths and the cases of M equal to 8, 9, 80 and 90. For the lengths larger than L_break the proposed method shows a progressive increase in processing efficiency over the current method. The break length L_break is 16; (1−1; M). In the case of small line lengths, the overhead per pixel in loop setup and pointer resetting outside the loop of the proposed method, requires more instructions for the line than the prior art method. As the line length increases the relative contribution of the overhead of the inventive method reduces. A break even point is reached at L_break. Beyond L_break, the relative contribution of the overhead reduces greatly and finally reaches a saturation where it is negligible. The proposed method reduces the on-chip memory requirement by ((M−1)*100)/(2M)% or slightly less than 50%, for the odd M case over the prior art. The proposed method for even M has a reduction of 15.82% (for even M=8,9) and 18% (for even M=80,90) in the case of large lines of over 180 pixels over the prior art. The proposed method for odd M has a maximum reduction of 16.18% (for odd M=8,9) and 18% (for odd M=80,90) in the case of large lines of over 180 pixels over the prior art. The processing efficiency improves progressively for increasing line length's larger than L_break length and saturates at various maximum improvement figures for various M values. Since the typical line length for screening is much greater than L_break (18 pixels), the proposed method has significant advantages.

A typical application for the proposed approach is in real time multi-level threshold screening which is an integral part of embedded raster image (RIP) software. The implementation of a screening process on multiprocessor integrated having constrained on-chip memory has to balance memory requirements and processing time in order to meet real time performance. The proposed method judiciously allocates on-chip resources by employing a processing loop with the least overhead per pixel processing. Thus the proposed method contributes to achieving the real time embedded performance constraints, both in terms of memory and processing time. The same concept can easily be extended to the cases of different number of input pixel bits and output pixel bits.

What is claimed is:

1. The computer implemented method of multi-level screening for approximating a gray scale tone with a more limited range image producer via a preference matrix, comprising the steps of:
   dividing each row of said preference matrix into at least two segments of fixed size;
   loading lookup tables associated with one of said segments of said preference matrix from a system memory into a local memory;
   screening input pixels via said lookup tables associated with said one segment of said preference matrix all pixels on a selected scan line mapping into said one segment of said preference matrix;
   loading lookup tables associated with a next segment of said preference matrix from the system memory into local memory thereby replacing the lookup tables associated with the prior segment; and
   screening input pixels via said lookup tables associated with said next segment of said preference matrix all pixels on a selected scan line mapping into said next segment of said preference matrix;
   until pixels of said selected scan line mapping into all segments of said preference matrix are screened.

2. The computer implemented method of claim 1, wherein:
   the number of bits of the more limited range of the image producer is half of a data word; and
   each step of screening input pixels via said Lookup tables associated with a segment of said preference matrix includes
      sequentially screening pairs of input pixels to corresponding pairs of output pixels, and
      packing each pair of output pixels into a single data word.

3. The computer implemented method of claim 2, wherein:
   the number of elements of preference matrix in the direction of the scan line is M, where M is odd; and
   each step of screening input pixels via said lookup tables associated with a segment of said preference matrix includes
      doubling the size of the corresponding lookup table by duplicating lookup table entries for elements M+1 to 2M, and
      indexing into said duplicated lookup table by a pixel scan line position index modulo 2M.

4. A printer comprising:
   a transceiver adapted for bidirectional communication with a communications channel;
   a memory;
   a print engine adapted for placing color dots on a printed page according to received image data and control signals; and
   a programmable data processor connected to said transceiver, said memory and said print engine, said programmable data processor having a local memory and programmed to
      receive print data corresponding to pages to be printed from the communications channel via said transceiver;
      convert said print data into image data and control signals for supply to said print engine for printing a corresponding page, said conversion including
         dividing each row of said preference matrix into at least two segments of fixed size, loading lookup tables associated with one of said segments of said preference matrix from said memory into said local memory, screening input pixels via said lookup tables associated with said one segment of said preference matrix all pixels on a selected scan line mapping into said one segment of said preference matrix, loading lookup tables associated with a next segment of said preference matrix from said memory into said local memory thereby replacing the lookup tables associated with the prior segment, screening input pixels via said lookup tables associated with said next segment of said preference matrix all pixels on a selected scan line mapping into said next segment of said preference matrix, until pixels of said selected scan line mapping into all segments of said preference matrix are screened; and control said print engine according to said image data and control signals to print a corresponding page.

5. The printer of claim 4, wherein:

a number of bits of the screened output is half of a data word; and said programmable data processor is further programmed whereby screening input pixels via said lookup tables associated with a segment of said preference matrix includes sequentially screening pairs of input pixels to corresponding pairs of output pixels, and packing each pair of output pixels into a single data word.

6. The printer of claim 5, wherein:

a number of elements of preference matrix in the direction of the scan line is M, where M is odd; and said programmable data processor is further programmed whereby loading lookup table associated with a segment of the preference matrix includes doubling the size of the lookup table by duplicating lookup table entries for elements M+1 to 2M, and screening input pixels via said lookup tables associated with a segment of said preference matrix includes indexing into said duplicated lookup table by a pixel scan line position index modulo 2M.

7. The computer implemented method of multi-level screening for approximating a gray scale tone with a more limited range image producer via a preference matrix, comprising the steps of:

dividing each row of said preference matrix into at least two segments of fixed size;

loading lookup tables associated with one of said segments of said preference matrix from a system memory into one of two buffers of local memory;

for each segment of the preference matrix simultaneously screening input pixels via said lookup tables stored in one buffer of local memory associated with a current segment of said preference matrix all pixels on a selected scan line mapping into said one segment of said preference matrix, loading lookup tables associated with a next segment of said preference matrix from the system memory into the other buffer of local memory thereby replacing the lookup tables associated with a prior segment; and until pixels of said selected scan line mapping into all segments of said preference matrix are screened.

8. A printer comprising:

a transceiver adapted for bidirectional communication with a communications channel;

a memory;

a print engine adapted for placing color dots on a printed page according to received image data and control signals; and a programmable data processor connected to said transceiver, said memory and said print engine, said programmable data processor having a local memory and programmed to receive print data corresponding to pages to be printed from the communications channel via said transceiver;

convert said print data into image data and control signals for supply to said print engine for printing a corresponding page, said conversion including dividing each row of said preference matrix into at least two segments of fixed size, loading lookup tables associated with one of said segments of said preference matrix from said memory into one of two buffers of said local memory, for each segment of said preference matrix simultanously screening input pixels via said lookup tables stored in one buffer of local memory associated with said one segment of said preference matrix all pixels on a selected scan line mapping into said one segment of said preference matrix, and loading lookup tables associated with a next segment of said preference matrix from said memory into the other buffer of said local memory thereby replacing the lookup tables associated with a prior segment, until pixels of said selected scan line mapping into all segments of said preference matrix are screened; and control said print engine according to said image data and control signals to print a corresponding page.

* * * * *